US012226916B2

(12) United States Patent
Sisley (10) Patent No.: US 12,226,916 B2
(45) Date of Patent: Feb. 18, 2025

(54) TRIGGERING DYNAMIC ROBOTIC PROCESS AUTOMATION (71) Applicant: Microsoft Technology Licensing, LLC, Redmond, WA (US)

(72) Inventor: Mark David Sisley, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 855 days.

(21) Appl. No.: 17/359,292

(22) Filed: Jun. 25, 2021

(65) Prior Publication Data
US 2022/0410398 A1 Dec. 29, 2022

(51) Int. Cl.
G06F 9/455 (2018.01)
B25J 9/16 (2006.01)
G06F 3/16 (2006.01)
G06F 9/451 (2018.01)
G06F 9/48 (2006.01)
G06N 20/00 (2019.01)

(52) U.S. Cl.
CPC ............. B25J 9/1694 (2013.01); B25J 9/163 (2013.01); G06F 3/167 (2013.01); G06F 9/451 (2018.02); G06F 9/4806 (2013.01); G06N 20/00 (2019.01)

(58) Field of Classification Search
CPC ......... G06F 9/451; G06F 9/4806; G06F 3/167
See application file for complete search history.

(56) References Cited

U.S. PATENT DOCUMENTS

| 7,793,154 | B2 | 9/2010 | Chagoly et al. |
| 10,276,170 | B2 | 4/2019 | Gruber et al. |
| 10,540,976 | B2* | 1/2020 | Van Os ............... G06F 3/167 |
| 2014/0278413 | A1 | 9/2014 | Pitschel et al. |
| 2020/0074329 | A1 | 3/2020 | Sturtivant et al. |
| 2020/0233707 | A1 | 7/2020 | Ramamurthy et al. |
| 2021/0109730 | A1 | 4/2021 | Singh |

FOREIGN PATENT DOCUMENTS

| CN | 113011142 A | 6/2021 | |
| CN | 112201222 A * | 1/2022 | .......... G10L 13/033 |
| WO | 2015184186 A1 | 12/2015 | |

OTHER PUBLICATIONS

"International Search Report and Written Opinion Issued in PCT Application No. PCT/US22/029729", Mailed Date: Jul. 25, 2022, 16 Pages.
"#UiPath Voice Recognition Automation Demo Video (#RPA)", Retrieved from: https://www.youtube.com/watch?v=6PNvWHzwZ8Q, Sep. 11, 2019, 3 Pages.

(Continued)

Primary Examiner — Diem K Cao
(74) Attorney, Agent, or Firm — Barta Jones, PLLC (57) ABSTRACT A device and method for robotic process automation (RPA) using speech recognition that receives a voice input; invokes, using the received voice input, an RPA workflow, the RPA workflow comprising a sequence of tasks; based at least on the invoked RPA workflow, retrieves an argument from a cloud device; modifies, with the retrieved argument, at least one task of the sequence of tasks; and executes the modified at least one task as part of the RPA workflow.

20 Claims, 6 Drawing Sheets

(56) References Cited

OTHER PUBLICATIONS

"Advanced Scripting Basic Language", Retrieved from: https://web.archive.org/web/20210419040008/https://www.nuance.com/products/help/dragon/dragon-for-pc/scriptref/Content/vbs/speechlinks_basic_language.htm, Apr. 19, 2021, 1 Page.

"Creating Macro Recorder Commands", Retrieved from: https://web.archive.org/web/20210529114823/https://www.nuance.com/products/help/dragon/dragon-for-pc/enx/professionalgroup/main/Content/MyCommands/mycmds_2/recorder_macros.htm, May 29, 2021, 1 Page.

"Dragon NaturallySpeaking Creating Voice Commands", Retrieved from: https://web.archive.org/web/20210201114425/https://www.speechrecsolutions.com/assets/VoiceCmd.pdf, Aug. 1998, 141 Pages.

"KnowBrainer 2017 Command Utility", Retrieved from: https://web.archive.org/web/20210306124426/https://shop.knowbrainer.com/store/pc/viewCategories.asp?idCategory=4, Mar. 6, 2021, 2 Pages.

"Scripting for Dragon NaturallySpeaking", Retrieved from: https://shop.knowbrainer.com/store/pc/viewPrd.asp?dproduct=198, Retrieved Date: Jun. 21, 2021, 2 Pages.

"Uipath Voice Integration|Python with Uipath Voice enabled bot|#vajrangtalks|#uipath", Retrieved from: https://www.youtube.com/watch?v=DWb3RWnc2wk, Nov. 3, 2018, 3 Pages.

"Voice-Activated Control for Your PC Games and Apps", Retrieved from: https://web.archive.org/web/20210413171522/https://voiceattack.com/Default.aspx, Apr. 13, 2021, 16 Pages.

"VoiceAttack", Retrieved from: https://web.archive.org/web/20200402001400/https://voiceattack.com/VoiceAttackHelp.pdf, Apr. 2, 2020, 234 Pages.

"What is RPA Technology? How it Amalgamates with Speech Recognition System?", Retrieved from: https://web.archive.org/web/20191128070427/https://indiantts.com/blog/what-is-rpa-technology-speech-recognition-system-automation-text-to-speech/, Nov. 28, 2019, 6 Pages.

Aalst, et al., "Robotic Process Automation—A Path to the Cognitive Enterprise", In Journal of Business & Information Systems Engineering, vol. 60, Issue 4, May 14, 2018, pp. 269-272.

Filipowicz, Luke, "Everything you can do with Voice Control on iPhone and iPad", Retrieved from: https://www.more.com/everything-you-can-do-voice-control-iphone-and-ipad, Jun. 30, 2020, 22 Pages.

Jensen, Anders, "UiPath | How to use Google Cloud Speech API Powered by Machine Learning | Tutorial", Retrieved from: https://www.youtube.com/watch?v=qG35vVwU5fE, Feb. 17, 2020, 4 Pages.

Kulhari, Vikas, "UiPath : Speech Recognition (Control Bots with Voice)", Retrieved from: https://www.youtube.com/watch?v=IWPAcKYxtAw, May 4, 2019, 3 Pages.

Peterson, Mike, "This Powerful iOS Feature Lets you Control your iPhone without Touching it", Retrieved from: https://appletoolbox.com/how-to-use-voice-control-on-iphone/, Oct. 29, 2019, 14 Pages.

Schatsky, et al., "Robotic Process Automation—A Path to the Cognitive Enterprise", Retrieved from: https://www2.deloitte.com/us/en/insights/focus/signals-for-strategists/cognitive-enterprise-robotic-process-automation.html, Sep. 14, 2016, 10 Pages.

"Use Siri to Run IFTTT Applets", Retrieved from: http://web.archive.org/web/20210314220924/https://help.ifttt.com/hc/en-us/articles/360053753113-Use-Siri-to-Run-IFTTT-Applets, Mar. 14, 2021, 5 Pages.

"Sikulix Integration", Retrieved from: https://caster.readthedocs.io/en/latest/readthedocs/Third-party_Integrations/Sikuli/, Jun. 23, 2021, 2 Pages.

* cited by examiner

TRIGGERING DYNAMIC ROBOTIC PROCESS AUTOMATION

BACKGROUND

Process automation traditionally utilizes specific trigger inputs to initiate performance of a specific series of commands. A trigger can be an input, such as a textual input, or a task being executed, such as an electronic mail (email) message being received. Using textual inputs is slow and cumbersome, and requiring textual input reduces accessibility. Further, many process automation systems perform the same coded series of commands each time the process automation is invoked.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method for process automation using speech recognition is described. The method includes receiving a voice input, invoking robotic process automation (RPA) workflow comprising a sequence of tasks, based on the invoked RPA workflow, retrieving an argument from a cloud device, based on the retrieved argument, modifying at least one task of the sequence of tasks in the RPA workflow, and executing the modified at least one task as part of the RPA workflow.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 5, the systems are illustrated as schematic drawings. The drawings may not be to scale.

DETAILED DESCRIPTION

Aspects of the disclosure provide a computerized method and system for robotic process automation (RPA) workflow using speech recognition as a trigger to initialize RPA workflow and call one or more of a cloud device or a clipboard manager and obtain an output that is able to be used by the device implementing the RPA workflow. The device receives a voice input, invokes an RPA workflow comprising a sequence of tasks, based on the invoked RPA workflow, retrieves an argument from a cloud device, based on the retrieved argument, modifies at least one task of the sequence of tasks in the RPA workflow, and executes the modified at least one task as part of the RPA workflow. For example, execution of the task involves interacting with the user interface automatically (e.g., without user input). In this manner, the retrieved arguments are dynamic (e.g., not static), at least because their value can change with each invocation. Further, the task(s) in the process automation are thus dynamic at least because the tasks can change, based on the retrieved argument, with each invocation.

Accordingly, the system provided in the present disclosure operates in an unconventional manner by triggering the initiation of an RPA workflow using voice activation, calling the one or more of the cloud device or clipboard manager, receiving an argument from the cloud device or clipboard manager (or other data storage area), modifying a task, or activity, of the RPA workflow, and executing the modified task on a user interface. In contrast to current solutions, which are either unable to initiate an RPA workflow based on a speech input, execute an output from a cloud device or clipboard manager in a meaningful way, or both, the system described herein provides a solution to improve both the initialization process of the RPA workflow and the execution of a task based on the results of the RPA workflow.

Additional aspects of the disclosure include a machine learning (ML) component. The ML component learns the data flow of particular received inputs, through calling the cloud device and/or clipboard manager and executing a task in order to train the RPA and further optimize the systems and methods implementing the RPA workflow. This enables the ML component to generate a new data flow, after learning the data flow of particular inputs, in order to modify one or more tasks to further improve the RPA workflow. Generating the new data flow modifies one or more tasks performed as part of the RPA workflow, enabling the RPA workflow to continually evolve and improve in real-time. For example, the improvements can include executing the RPA workflow more quickly, more efficiently, to use computing resources more efficiently, and so forth.

Aspects of the disclosure improve the functioning of a computing device at least by reducing usage of computing resources. For example, the operations of activating process automation, such as an RPA workflow, based on receiving a voice input, modifying a task of the RPA workflow, and executing the modified tasks uses less memory, less bandwidth, and/or less processing of a traditional computing device while also saving time for a user of the computing device. In another example, the combination of the speech input with the other elements described herein improves the human-computer interface, resulting in more technically efficient operation. In yet another example, the modification of at least one task of the RPA workflow further optimizes the RPA workflow in order to manage the computing resources more effectively by continually improving the operations of the RPA workflow and improving the RPA workflow's use of computing resources.

While some examples are described with reference to RPA workflows, aspects of the disclosure are operable with any form of process automation, such as can be run in the cloud or on an edge device, invoking APIs, and/or automating the user experience. Some examples described herein extend the types of triggers for process automation to include voice, where the process automation executes custom scripts (e.g., a set of tasks) from the user, with custom data, and launched by voice. In contrast, traditional voice assistants merely execute generic skills built and published by developers (e.g., original equipment manufacturer developers).

As referenced herein, process automation is a coordinate- and input-based process of automating one or more steps in a process. For example, to initiate a sequence, or script, executed by process automation on an electronic device, a user manipulates an input device, such as a mouse, a trackpad, and so forth, to move a visual representation, such as a cursor, on a user interface display. The electronic device detects the coordinates, such as in an (x, y) format, of the cursor, identifies a visualization on the user interface corresponding to the coordinates, and executes an action or a series of actions based on the determination of the coordinates.

As referenced herein in some examples, RPA workflows are not pointer or mouse coordinate based. An RPA workflow is a sequence of tasks, or activities, that are executed as part of a computer-implemented process based on identifying a user interface element (e.g., such as using a particular tag or label). In some examples, the user interface element is detected by navigating a user interface hierarchy. In other words, in an RPA workflow, or sequence, activities are not executed based on the coordinates of a cursor that is controlled via an input device, such as a mouse, a trackpad, a keyboard, and so forth, but performed automatically based on the detection of a particular user interface element.

In some examples, an RPA workflow can utilize several distinct methods to seek, detect, and identify user interface elements to operate on. These methods can include, but are not limited to, User Interface Automation (UIA), image recognition, and optical character recognition (OCR). In some examples, UIA provides programmatic access to user interface elements on a user interface based on geometric matches of labels, or tags, identified in the user interface. In other words, rather than merely operating on specific coordinates in the user interface, which are subject to change with different screen resolutions and user configurations, or scanning the user interface for a particular label, an RPA workflow intelligently scans user interface elements displayed on the user interface in order to identify an element with which to interact. In some examples, an RPA workflow executes a sequence of tasks based on the intelligent scan of the user interface and does not depend on an input received from an input device including, but not limited to, a keyboard, a mouse, a trackpad, and so forth. In some examples, RPA workflows include executing the sequence of tasks based on the reception of a voice input. For example, based on the detection of a voice input, UIA executes an intelligent scan of the user interface and the RPA workflow is thus invoked.

Figure 1:
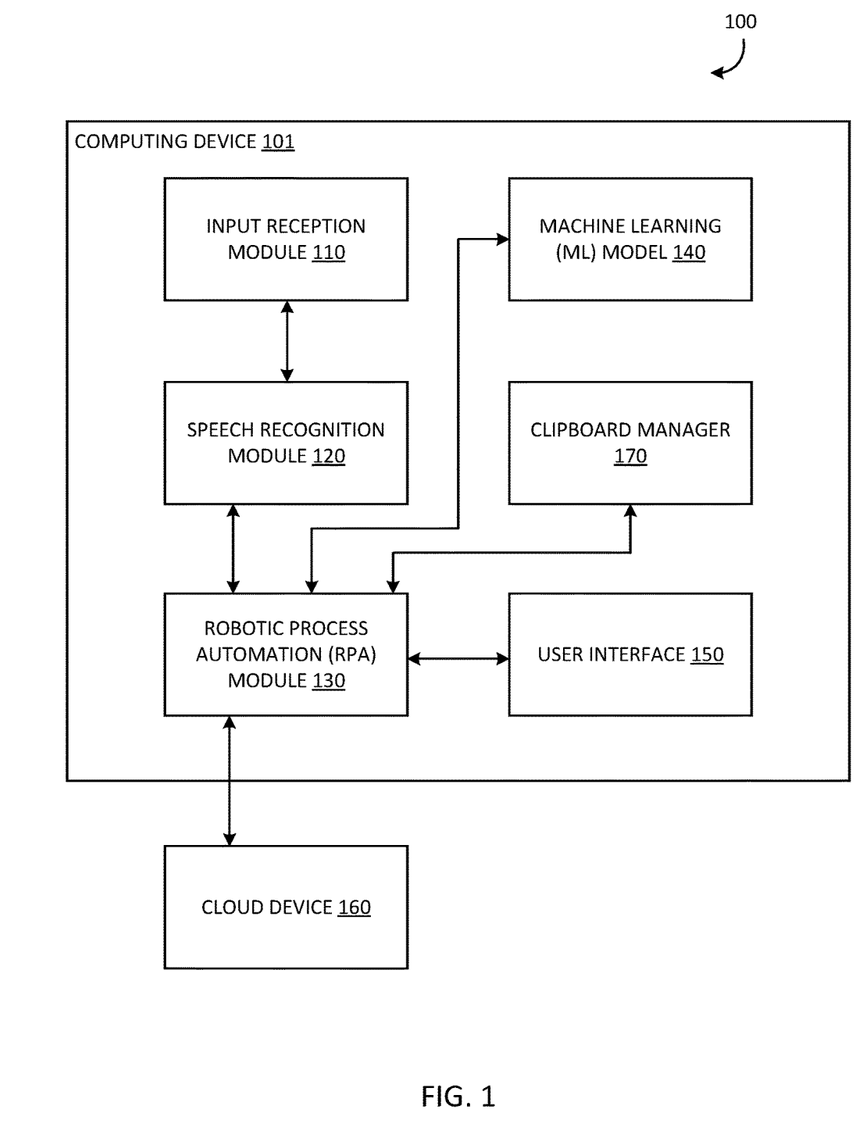
FIG. 1 is a block diagram illustrating a system for process automation using speech recognition.

FIG. 1 is a block diagram illustrating a system for using speech recognition according to an example. The system 100 illustrated in FIG. 1 is provided for illustration only. Other examples of the system 100 can be used without departing from the scope of the present disclosure.

The system 100 includes a computing device 101. The computing device 101, in some examples, includes a mobile computing device or any other portable device. A mobile computing device 101 includes, for example but without limitation, a mobile telephone, laptop, tablet, computing pad, netbook, gaming device, wearable device, Internet of Things (IoT) device, and/or portable media player. The computing device 101 can also include less-portable devices such as servers, desktop personal computers, kiosks, IoT devices, or tabletop devices. Additionally, the computing device 101 can represent a group of processing units or other computing dev ices. In some examples, the computing device 101 is a device executed in the cloud. The computing device 101 includes an input reception module 110, a speech recognition module 120, an RPA module 130, an ML model 140, and a user interface 150. The speech recognition module 120, RPA module 130, and ML model 140 can be implemented on one or more processors, such as the processor 519 illustrated in FIG. 5 and described in greater detail below.

The input reception module 110 includes one or more devices that receive an input, such as an input from a user of the computing device 101. In some examples, the input reception module 110 is a device that receives a speech input, such as a microphone. In some examples, the input reception module 110 is a device that receives a textual input, including but not limited to a keypad, a keyboard, a touch screen device, or a mouse. In some examples, the input reception module 110 includes each of a speech input device and a textual input device.

The speech recognition module 120 includes a device or application that analyzes a received speech input and converts the speech input to text. The speech recognition module 120 recognizes and identifies speech in the input received by the input reception module 110. The speech recognition module 120 interprets the sound waves received by the input reception module 110, recognizes the patterns in the sound waves, and converts the patterns into text. In some examples, the speech recognition module 120 identifies at least one parameter in the received input. The at least one parameter includes a particular word or phrase that is used to identify a particular process automation, such as an RPA workflow, to be executed based on the received speech input. For example, the particular computing device 101 can store numerous RPA workflows to be executed, each RPA workflow including a particular sequence of tasks and invoked by a particular received speech input. In some examples, the RPA module 130 includes each of the RPA workflows configurable to be executed. In other examples, the computing device 101 includes a separate RPA module 130 corresponding to each of the RPA workflows. In other words, a separate RPA module 130 can be provided for each RPA workflow. The parameter, or parameters, identified in the received input correspond to the particular RPA workflow to be invoked and executed.

The RPA module 130 includes a device or application that executes robotic process automation and is invoked based on the input received via the input reception module 110. In some examples, the RPA module 130 determines a command for a task or a plurality of tasks based on the identified at least one parameter and executes the RPA workflow based on the received textual input. In some examples, the RPA module 130 executes the RPA workflow based on the received speech input. The RPA module 130 requests an argument, or a command, from one or both of the cloud device 160 and the clipboard manager 170, retrieves the argument from the one or both of the cloud device 160 and the clipboard manager 170, modifies one or more tasks based on the retrieved argument, and executes the modified task or tasks.

For example, as described herein, the RPA module 130 utilizes UIA to execute an RPA workflow based at least in part on the parameter or parameters identified by the speech recognition module 120. In some examples, the RPA module 130 precisely identifies a user interface element to select in the authoring of a particular script, i.e., a particular RPA workflow, based on the execution of the UIA. In other words, based on the identification of a user interface element on the user interface 150, the RPA module 130 makes a call to a flow running the cloud device 160 and/or on the clipboard manager 170. Therefore, authoring a new RPA workflow, or sequence, is improved based on the detection of a user interface element on the user interface 150, rather than requiring a user to manipulate a physical input device such as a keyboard, a mouse, a trackpad, and so forth to initiate a sequence including process automation.

As referenced herein, process automation executed by the system 100 can be executed in various formats and by various devices. For examples, various examples of process automation can be executed in the cloud, on an edge device, on a single device such as the computing device 101, or a combination of these. In some examples, process automation invokes one or more application programming interfaces (APIs). In some examples, process automation automates a particular user experience. In one example, the process automation is RPA that utilizes voice input as a trigger to invoke the RPA workflow. The RPA workflow executes a user's own script based on a voice input rather than a pre-programmed or pre-developed script.

In some examples, the RPA module 130 is selected based on the at least one parameter. For example, the at least one parameter indicates a particular RPA workflow of a plurality of possible RPA workflows that can be invoked. For example, the at least one parameter can be a particular word or string of words that, when received in the input by the input reception module 110, corresponds to a particular RPA which, in turn, corresponds to a particular argument to be retrieved from the one or both of the cloud device 160 and the clipboard manager 170.

In some examples, an RPA workflow is invoked based on the reception of the input by the input reception module 110 and execution of speech recognition by the speech recognition module 120. As described herein, an RPA workflow includes a task, i.e., an activity, or a sequence of tasks or activities, that are executed as part of a computer-implemented process. In some examples, the tasks or sequence of tasks included in the RPA workflow are executed on a user interface (UI). For example, a user traditionally executes a plurality of inputs on a UI to execute a program or a step of a program. The inputs can include a left- or right-click via a mouse on a particular area or region of the UI. When stringed together in sequence, the inputs result in a particular process to execute a command or a plurality of commands, execute a task or a plurality of tasks, execute a program, and so forth. An RPA workflow automates the tasks to automatically execute the sequence of tasks. As described herein, automatically executing a sequence of steps, or tasks, refers to executing the task or tasks without receiving additional user input. In one example, an RPA workflow automates complex frameworks and hierarchies for a UI path.

An example of a sequence of tasks, or activities, to be executed by RPA is the opening of a new tab in a specific web browser to a particular URL. The sequence of tasks are performed sequentially in order to execute the RPA workflow of opening the new tab. In this example, the first task is to read a particular CSV file from a file explorer. Then, a web service is invoked to download a page from a particular web site and store the downloaded page. A json file is converted to a custom object. For example, json %WebServiceResponse% is converted to a custom object %DatabaseResponse%. The next task is to set a variable, such as %URL%. Based on the set variable, a new browser is launched as a foreground window and the instance is stored into %Browser%. Finally, a new tab within the new browser is created and navigated to the set variable equal to %URL%. Any one of the individual tasks in the sequence of tasks can be modified based on the retrieved argument from the one or both of the cloud device 160 and the clipboard manager 170.

Another example of a task to be executed is the attachment of a particular type of data into another application. For example, a particular type of data, such as an image, text, audio, etc. can be copied from a first source, such as a file system or a web browser, and pasted into a messaging application, such as an email application. The task is broken up into steps including, but not limited to, reading a particular file in the file system, copying text from the read file, transmitting a command to the clipboard manager 170 to store the copied text, launching an email application as a foreground window, executing a new mail task in the email application, obtaining the copied text from the clipboard manager 170, and pasting the copied text from the clipboard manager into the new mail task. In this example, the email application and the clipboard manager 170 are stored as computer-readable media stored on a memory of the computing device 101. For example, where the computing device 101 is the computing apparatus 518 illustrated in FIG. 5 and discussed in greater detail below, instructions for the email application and the clipboard manager 170 are stored as program code on the memory 522.

In yet another example, both the cloud device 160 and the clipboard manager 170 are used in the sequence of tasks. The copied text to the clipboard manager 170 can be a user identifier. The task executed can be to look up information stored in a database, such as stored in the memory 522, and paste the looked-up information into the new mail task of the email application. In some examples, the information can include, but is not limited to, a user's name and contact information, a company's name and contact information, a customer's most recent invoice, and so forth. In some examples, the information is copied and stored to a clipboard, for example the clipboard manager 170. An input can be received, such as the voice or text input, by the input reception module 110, and the corresponding RPA module 130 is invoked using the resource. The corresponding RPA module 130 then executes a cloud automation flow to perform the next task or tasks, such as retrieving a URL as described above.

As discussed herein, the RPA module 130 retrieves an argument from one or both of the cloud device 160 and the clipboard manager 170 based on the input received by the input reception module 110. In some examples, retrieving the argument includes transmitting a request for the argument and then receiving a response that includes the argument. For example, the RPA module 130 transmits a request for an argument, or command, to one or both of the cloud device 160 and the clipboard manager 170 based on the identified parameter. For example, the RPA module 130 identifies which of the cloud device 160 and the clipboard manager 170 is used to execute the particular task specified by the command based on the at least one parameter. In examples where the cloud device 160 is used to execute the task, the RPA module 130 transmits the request for the argument to the cloud device 160. In examples where the clipboard manager 170 is used to execute the task, the RPA module 130 transmits the request for the argument to the clipboard manager 170. In some examples, both the cloud device 160 and the clipboard manager 170 are used to execute the task and, accordingly, the RPA module 130 transmits the request for the argument to both the cloud device 160 and the clipboard manager 170.

Following an analysis of the request for the argument by the one or both of the cloud device 160 and the clipboard manager 170, the RPA module 130 receives a response including the argument from the one or both of the cloud device 160 and the clipboard manager 170. The RPA module 130 receives the response including the argument from each of the one or both of the cloud device 160 and the clipboard manager 170 to which the request for the argument was transmitted. In other words, where the request for the argument was transmitted to the only the cloud device 160, a response is received from the cloud device 160. Where the request for the argument was transmitted to only the clipboard manager 170, a response is received from the clipboard manager 170. Where the request for the argument was transmitted to each of the cloud device 160 and the clipboard manager 170, responses are received from each of the cloud device 160 and the clipboard manager 170. The RPA module 130 further modifies at least one of the tasks in the sequence of tasks based on the argument retrieved from the one or both of the cloud device 160 and the clipboard manager 170. Modifying the at least one of the tasks in the sequence of tasks is described in greater detail below.

In some examples, an additional, or second, input is received by the input reception module 110. The original input can include an error or mistake that requires correction in order for the correct command to be determined and the correct task or sequence of tasks to be executed based on the argument. In other examples, the original input times out and requires updating. In examples where the input is a speech input, the speech can be misspoken or unclear in the first input and then be corrected by the second input. In examples where the input is a text input, the text can include a typographical error in the first input and then be correct by the second input. In some examples, a textual version of the original input is displayed on the user interface 150. The user can review the displayed textual version of the original input in order to identify whether the original input is sufficient or in need of correcting. When the original input requires correcting, the user can provide a second input that is received by the input reception module 110.

In some examples, the input reception module 110 receives natural language as an input. In various examples, the natural language input is one or both of the first input and the second input. For example, the speech recognition module 120 can include a natural language processor to process received natural language and extract commands to invoke the RPA module 130 based on the received natural language. Accordingly, examples of the present disclosure enable the RPA module 130 to be invoked using an input of natural language.

Based on receiving the second input, the RPA module 130 retrieves an updated argument from the one or both of the cloud device 160 and the clipboard manager 170. The RPA module 130 retrieves the updated argument using the same process by which the first argument was retrieved, as described in greater detail above.

The cloud device 160 includes a cloud-computing device or a cloud-computing environment that provides cloud-based services. For example, the cloud device 160 can be a cloud-based server that executes cloud-based applications, some of which may have a corresponding "client" application that executes on a device local to the user (e.g., computing device 101).

The clipboard manager 170 includes a computer program that includes functions to store data from an application that can then be retrieved for use in the same or a different application. For example, data can be "copied" from an application and stored on the clipboard manager 170. The copied data can then be retrieved from the clipboard manager 170 and "pasted" into the same or a different application than the original application from which the data was copied. In some examples, the execution of a command to copy data automatically stores the data on the clipboard and the execution of a command to paste data automatically retrieves and pastes the data from the clipboard. Accordingly, the clipboard manager 170 is used to execute tasks relating to storing data and enabling the retrieval of the data. As shown herein, the clipboard manager 170 can be implemented on the computing device 101 as a local program. However, other examples are possible without departing from the scope of the present disclosure. For example, the clipboard manager 170 can be implemented on a device external to the computing device 101 or can be implemented on a cloud-based device such as the cloud device 160.

The user interface 150 includes an interface provided on a display of the computing device 101 that provides a mechanism for a user to interact with the systems and applications of the computing device 101. In some examples, a task is executed on the user interface 150 based on the response received from the one or both of the cloud device 160 and the clipboard manager 170. Examples of executing the task on the user interface 150 is discussed in greater detail below.

In some examples, the computing device 101 includes an ML model 140. The ML model 140 is trained to learn a data flow of the computing device 101 based on the inputs received by the input reception module 110, the argument retrieved from the one or both of the cloud device 160 and the clipboard manager 170, the at least one task of the sequence of tasks modified based on the retrieved argument, and the modified at least one task executed on the user interface 150. For example, the ML model 140 learns that a particular input corresponds to a particular RPA workflow that retrieves a particular argument, and the particular argument corresponds to a particular task that is modified and executed on the user interface 150.

Based on the learned data flow, the ML model 140 generates a new data flow to further optimize the processes of the RPA module 130. The ML model 140 generates the new data flow by adding a task to the sequence of tasks, removing a task from the sequence of tasks, adjusting executing of a task, and/or reordering at least one task of the sequence of tasks. In some examples, based on the new data flow generated by the ML model 140, the RPA module 130 initiates a sequence of tasks that results in the execution of a modified task on the user interface 150 without being initiated by the input reception module 110 receiving an input. In another example, the ML model 140 generates a data flow that optimizes the execution of a modified task based on a received input, such as by removing the need to call the cloud device 160 or the clipboard manager 170 to modify and execute the task. In some examples, the ML model 140 includes, but is not limited to, a neural network, a statistical ML model, and so forth.

In some examples, the new data flow is initiated based on a particular trigger. Example triggers to invoke the RPA module 130 and initiate an RPA workflow include, but are not limited to, a voice input as described herein, a file monitor trigger, a hotkey trigger, an idle monitor trigger, an email monitor trigger, an exchange email monitor trigger, an event log monitor trigger, an event log monitor trigger, a ping trigger, a service monitor trigger, a process monitor trigger, a performance counter trigger, and a database monitor trigger. A file monitor trigger monitors a specified folder for files that are being created or deleted. A hotkey trigger monitors an input device, such as a keyboard, for a hotkey to be input. An idle monitor trigger fires after a specified time of user inactivity on the computing device 101. An email monitor trigger and/or an exchange email monitor trigger fires when specific emails arrive, such as from a particular email address or with a particular subject line. An event log monitor trigger monitors event logs and fires when a new event is created or deleted. A ping trigger pings a specified host and fires if the host fails to respond within a set timeout. A service monitor trigger triggers a particular service and fires when the state of the service changes. A process monitor trigger monitors the processes of running the computer and fires when a specific process starts or terminates. A performance monitor trigger monitors a performance counter set in the computing device 101 and fires when specific criteria are met. A database monitor trigger monitors a table of a database and fires when a specific operation occurs.

Figure 2A:
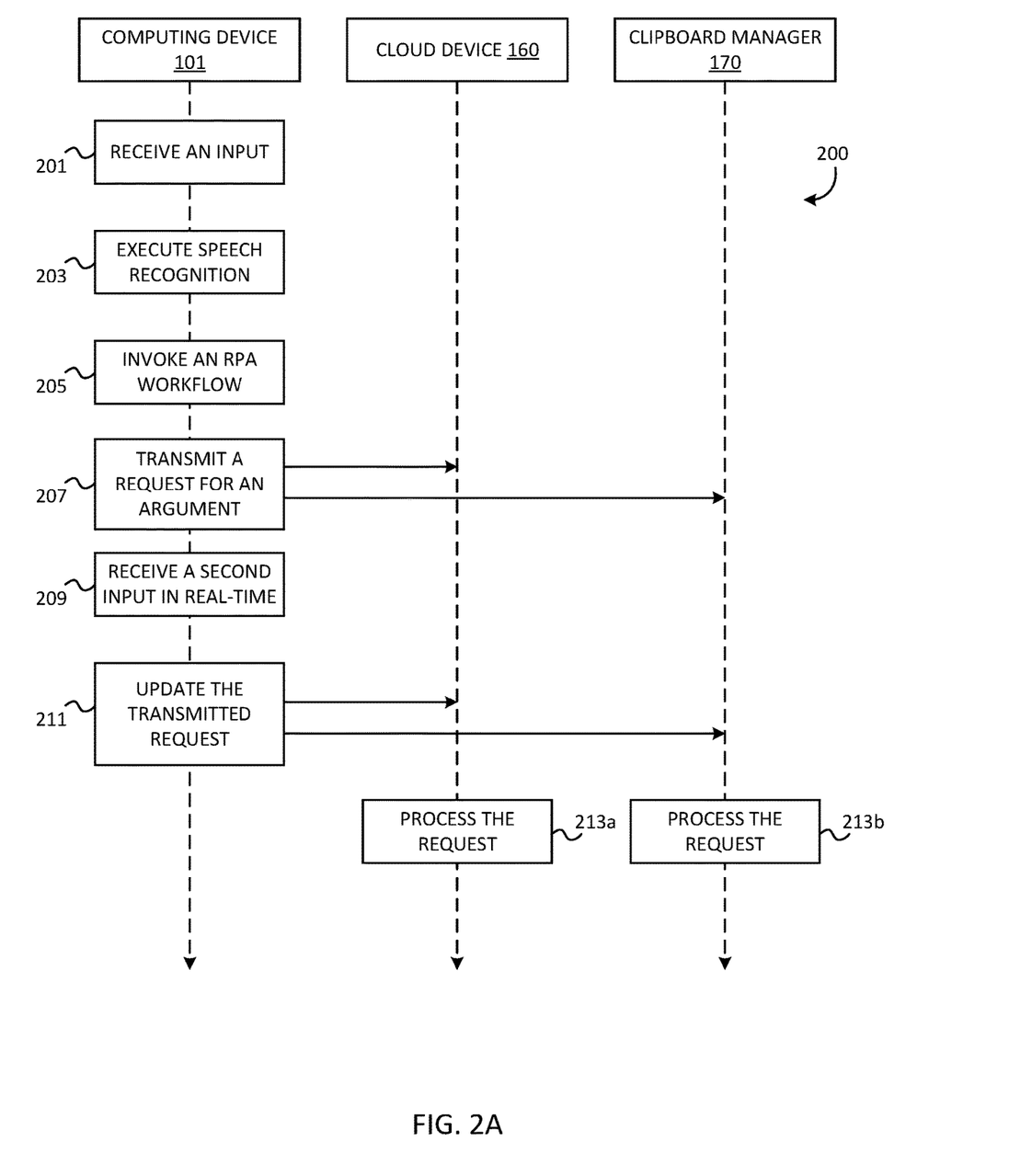
FIGS. 2A and 2B are sequence diagrams illustrating a computerized method for a robotic process automation (RPA) workflow using speech recognition.
Figure 2B:
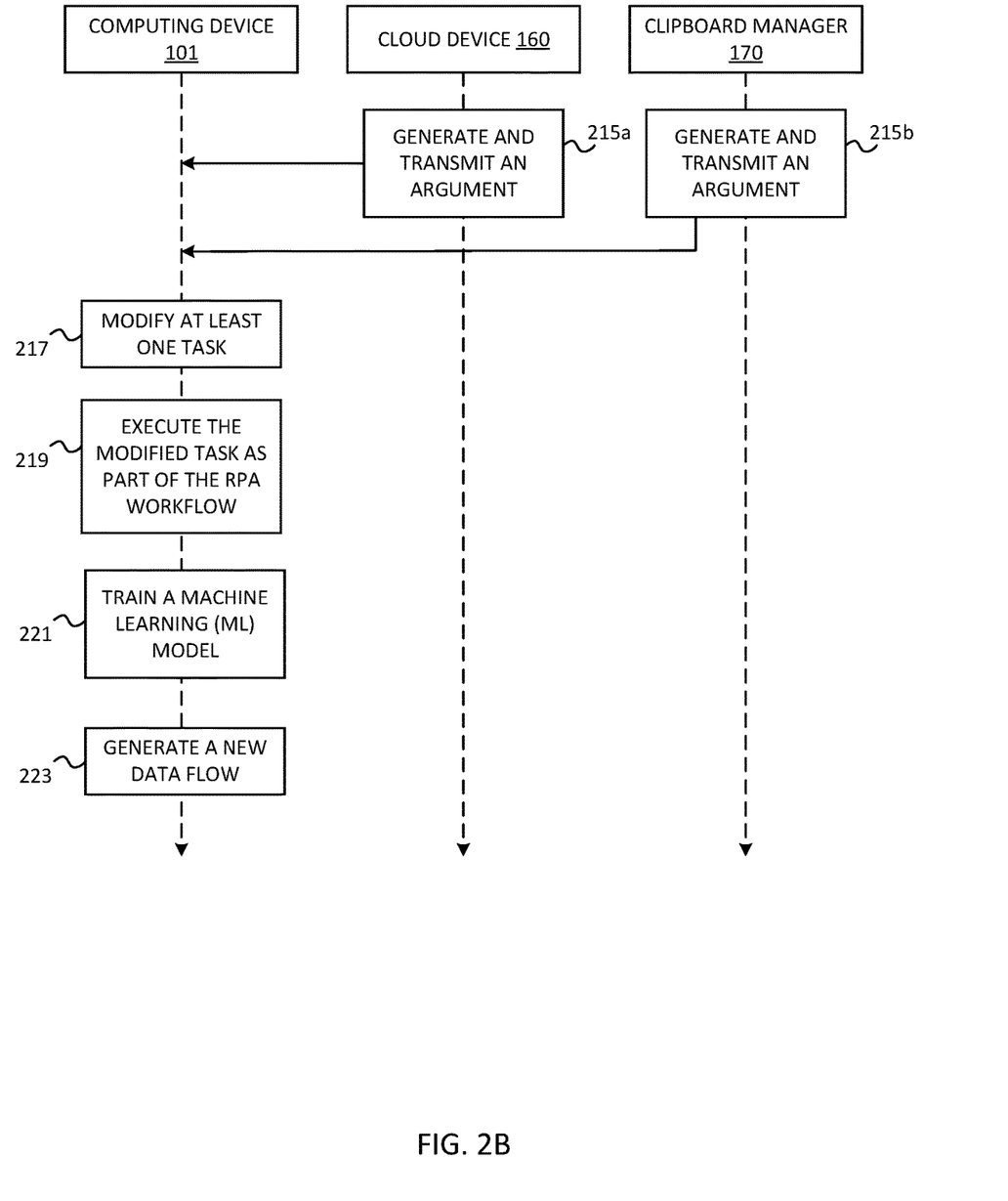

FIGS. 2A and 2B are sequence diagrams illustrating a computerized method for an RPA workflow using speech recognition according to an example. These flowcharts illustrate various options, not all of which are required for any one embodiment. For example, when requesting an argument at operation 207, the request may go to the cloud device 160, the clipboard manager 170, or both. In addition, operations 221 and 223 are optional.

The method 200 illustrated in FIGS. 2A and 2B is for illustration only. FIG. 2B extends FIG. 2A and is a continuation of the method 200 which begins in FIG. 2A. Other examples of the method 200 can be used without departing from the scope of the present disclosure. The method 200 can be implemented by one or more components of the system 100 illustrated in FIG. 1, such as the components of the computing apparatus 518 described in greater detail below in the description of FIG. 5. For example, FIGS. 2A and 2B illustrate the method 200 as performed by the input reception module 110, the speech recognition module 120, the RPA module 130, the ML model 140, the user interface 150, the clipboard manager 170, and the cloud device 160 of the system 100, but various examples are contemplated.

The method 200 begins by the input reception module 110 receiving an input at operation 201. The input reception module 110 can receive multiple types of inputs, such as a textual input or a voice input. In some examples, the voice input is received as sound waves that form a word or strings of words. In some examples, the received input in operation 201 is referred to as a first received input.

In operation 203, the speech recognition module 120 executes speech recognition on the received speech input. The speech recognition module 120 interprets the sound waves received by the input reception module 110, recognizes the patterns in the sound waves, and converts the patterns into a textual format. In some examples, the speech recognition module 120 identifies at least one parameter in the received input. As described herein, the at least one parameter includes a particular word or phrase that is used to identify a particular RPA workflow to be executed based on the received speech input. For example, the particular computing device 101 can store numerous RPA workflows, or scripts, to be executed, each RPA workflow including a particular sequence of tasks and invoked by a particular received speech input. In some examples, the RPA module 130 includes each of the RPA workflows configurable to be executed. In other examples, the computing device 101 includes a separate RPA module 130 corresponding to each of the RPA workflows. In other words, a separate RPA module 130 can be provided for each RPA workflow. The parameter, or parameters, identified in the received input correspond to the particular RPA workflow to be invoked and executed.

In operation 205, the RPA module 130 invokes an RPA workflow based on the reception of the input by the input reception module 110 and execution of speech recognition by the speech recognition module 120. As discussed above, RPA includes an automated workflow, i.e., a sequence of tasks that are executed on a user interface, such as the user interface 150. The RPA module 130 retrieves a particular argument from one or both of the cloud device 160 and the clipboard manager 170 based on the identified at least one parameter in the received input.

In operation 207, the RPA module 130 transmits a request for the argument to one or both of the cloud device 160 and the clipboard manager 170. In some examples, the RPA module 130 transmits the request for the argument to one or more of additional resources, such as local files stored on the computing device 101, settings for the computing device 101, user context including a zip code, name, and so forth, instead of or in addition to transmitting the request to one or both of the cloud device 160 and the clipboard manager 170. The RPA module 130 determines to transmit the request for the argument to the cloud device 160, the clipboard manager 170, or both based on the particular sequence of tasks included in the RPA workflow. For example, an RPA workflow including a sequence of tasks related to retrieving data from a database stored in the cloud retrieves an argument from the cloud device 160 only. An RPA workflow including a sequence of tasks related to copying and pasting data retrieves an argument from the clipboard manager 170 only. An RPA workflow including a sequence of tasks related to copying and pasting data and retrieving data from a database stored in the cloud retrieves arguments from both the cloud device 160 and the clipboard manager 170.

In some examples, the input received in operation 201, i.e., the first received input, is determined to be insufficient. For example, the first received input can include an error or mistake that requires correction in order for the correct argument, or arguments, to be determined. In examples where the first received input is insufficient, a prompt is displayed, such as via the user interface 150, requesting the input be provided again. In response to the prompt, a second input is received in real-time in operation 209. As referenced herein, real-time refers to operations being performed and executed immediately, or substantially immediately. In other words, the operations are performed with no noticeable delay between the operations. In other examples, the second input is received in real-time without the prompt being displayed. For example, the input can be received a second time due to the user recognizing a mistake in the first input. In particular, the user can recognize that the first received input corresponds to a different RPA workflow or a different argument than the one intended. In this example, the first received input may not be identified as including an error or mistake, but the user can recognize the incorrect RPA workflow or argument and repeat the input. The repeated input is then received as the second input. The speech recognition module 120 executes speech recognition on the received second input. In operation 211, the RPA module 130 updates the argument based on the results of the speech recognition executed on the received second input. In some examples, the updated argument replaces the original argument transmitted in operation 207. In other examples, the updated argument supplements the original argument transmitted in operation 207. For example, the updated argument can include both the original argument and the argument determined based on the received second input. It should be understood that while the method 200 is shown in FIGS. 2A and 2B as including operations 209 and 211, various examples are possible without departing from the scope of the present disclosure. For example, where a second input is not received, such as where the first input is sufficient, a second input may not be received and accordingly, the argument is not updated.

Accordingly, aspects of the present disclosure enable editing and updating in a particular data flow in real-time. It should be appreciated that as described herein, the data flow refers to the particular sequence of tasks to be performed in a particular RPA workflow. Editing and updating the data flow in turn changes the data flow of the RPA workflow by adding a task to the sequence of tasks to be performed in the RPA workflow, removing a task from the sequence of tasks to be performed in the RPA workflow, and/or modifying one or more of the tasks in the sequence of tasks to be performed in the RPA workflow.

In operations 213a and 213b, the request for the argument is processed by one or both of the cloud device 160 and the clipboard manager 170, respectively. As described above, the request for the argument is transmitted to one or both of the cloud device 160 and the clipboard manager 170. In examples where the request for the argument is transmitted to the cloud device 160, the cloud device 160 processes the request for the argument in operation 213a. In some examples, processing the request for the argument includes retrieving custom data that is tailored to the intent of the particular user. For example, the computing device 101 and/or the RPA module 130 can include a unique identifier as part of the request for the argument that identifies a user executing the RPA workflow. The custom data is specific to the user and enables the cloud device 160 and/or the clipboard manager 170 to provide the tailored data used by the RPA module 130 to execute the RPA workflow.

In examples where the request for the argument is transmitted to the clipboard manager 170, the clipboard manager processes the request for the argument in operation 213b. It should be understood that processing the request for the argument includes processing the request for the argument transmitted in operation 207, the request for the argument transmitted in operation 211, or both. In examples where the request for the argument is updated in operation 211 to replace the first request for the argument, operations 213a and/or 213b include processing the updated request for the argument. In examples where an updated request for the argument is not received, such as where the original received input is sufficient and an update is not required, operations 213a and/or 213b include processing the request for the argument transmitted in operation 207.

In operations 215a and 215b, an argument that responds to the received request for the argument is generated and transmitted to the computing device 101 by one or both of the cloud device 160 and the clipboard manager 170, respectively. In examples where the cloud device 160 processes the request for the argument in operation 213a, the cloud device 160 generates and transmits the argument in operation 215a. Similarly, in examples where the clipboard manager 170 processes the request for the argument in operation 213b, the clipboard manager 170 generates and transmits the argument in operation 215b. In examples where the cloud device 160 does not process the request for the argument, the cloud device 160 does not generate and transmit an argument. Likewise, in examples where the clipboard manager 170 does not process the request for the argument, the clipboard manager 170 does not generate and transmit an argument. In some examples, the argument includes the retrieved custom data tailored to the intent of the particular user retrieved during the processing of the request for the argument. For example, generating the argument includes preparing the custom data. In various examples, the custom data can include, but is not limited to, data regarding a specific customer, data regarding a specific incident ticket number, or any other suitable information to be used to execute a task of an RPA workflow.

It should be understood that the process of retrieving an argument from the one or both of the cloud device 160 and the clipboard manager 170 includes transmitting the request for the argument in operation 207, processing the request in operations 213a and 213b, and receiving the generated arguments that are transmitted in operations 215a and 215b. Retrieving the argument further includes transmitting the updated request in examples where a second input is received in real-time in operation 211.

In operation 217, the computing device 101 modifies at least one task in the sequence of tasks of the RPA workflow based at least on the retrieved argument. In some examples, modifying the at least one task includes performing a different operation in the particular task rather than the original task in the sequence of tasks, or performing the same operation but with different data. In the example of opening of the new tab in the specific web browser to the particular URL described above, modifying a task can include, but is not limited to, passing an argument into the RPA workflow by, for example, reading a different CSV file from the file explorer, invoking a different web service, converting the json file to a different custom object, setting a different variable, launching a different browser, and navigating to a different set variable. In the example of attaching data into another type of application, modifying a task can include, but is not limited to, copying a different type of data, copying the data from a different source, pasting the copied data to a different destination, and so forth.

In operation 219, the computing device 101 executes the modified task. Executing the modified task includes performing an operation or operations that complete the task. In some examples, the computing device 101 executes the modified task on the user interface 150 with, or using, the argument retrieved from the one or both of the cloud device 160 and the clipboard manager 170. In some examples, the computing device 101 executes each of the tasks included in the sequence of tasks but executes the modified task rather than the original task that was modified.

As described herein, the RPA workflow can include a sequence of tasks that include reading a particular CSV file from a file explorer, invoking a web service to download a page from a particular web site and store the downloaded page, converting a json file to a custom object, such as converting json %WebServiceResponse% to a custom object %DatabaseResponse%, setting a variable, such as %URL%, launching a new browser as a foreground window and storing the instance into %Browser%, creating a new tab within the new browser, and navigating to the set variable equal to %URL%. Each individual task, such as reading the CSV file, invoking the web service, and so forth, is executed. Upon completion of each task in the sequence, the RPA workflow is performed and completed.

In operation 221, the ML model 140 is trained to learn a data flow for the executed task. In some examples, the data flow includes the inputs received by the input reception module 110, retrieving the argument from the one or both of the cloud device 160 and the clipboard manager 170, modifying the task, and executing the modified task on the user interface 150. In some examples, the data flow includes the particular sequence of tasks corresponding to a particular received input. In the example above, the ML model 140 is trained to learn the data flow of the input received, each task of the sequence of tasks, and how the task is modified, and the executed modified task of creating the tab within the new browser navigated to the variable equal to %URL%. In other words, the ML model 140 learns the task corresponding to the received input and each step of how the task is executed.

In operation 223, the ML model 140 generates a new data flow based on the learned data flow. In some examples, the new data flow is a modified version of the learned data flow that is learned in operation 221. As described herein, the ML model 140 generates the new data flow by adding a task to the sequence of tasks, removing a task from the sequence of tasks, and/or reordering at least one task of the sequence of tasks. In some examples, based on the new data flow generated by the ML model 140, the RPA module 130 initiates a sequence of tasks that results in the execution of a modified task on the user interface 150 without being initiated by the input reception module 110 receiving an input. In another example, the ML model 140 generates a data flow that optimizes the execution of a modified task based on a received input, such as by removing the need to call the cloud device 160 or the clipboard manager 170 to modify and execute the task. In some examples, the ML model 140 includes, but is not limited to, a neural network, a statistical ML model, and so forth. In some examples, the ML model 140 generates the new data flow based at least in part on an instruction received from a user.

In some examples, the ML model 140 intelligently determines a user repeatedly performs a series of steps, or tasks, that can be replaced by an RPA workflow or a cloud API workflow. For example, the ML model 140 determines that the user performs the same series of user interface actions at the same time each day, the same time each month, before or after a particular recurring calendar event, and so forth. In this example, generating the new data flow includes generating and suggesting a new RPA workflow for the particular RPA workflow based on a new voice input.

Figure 3:
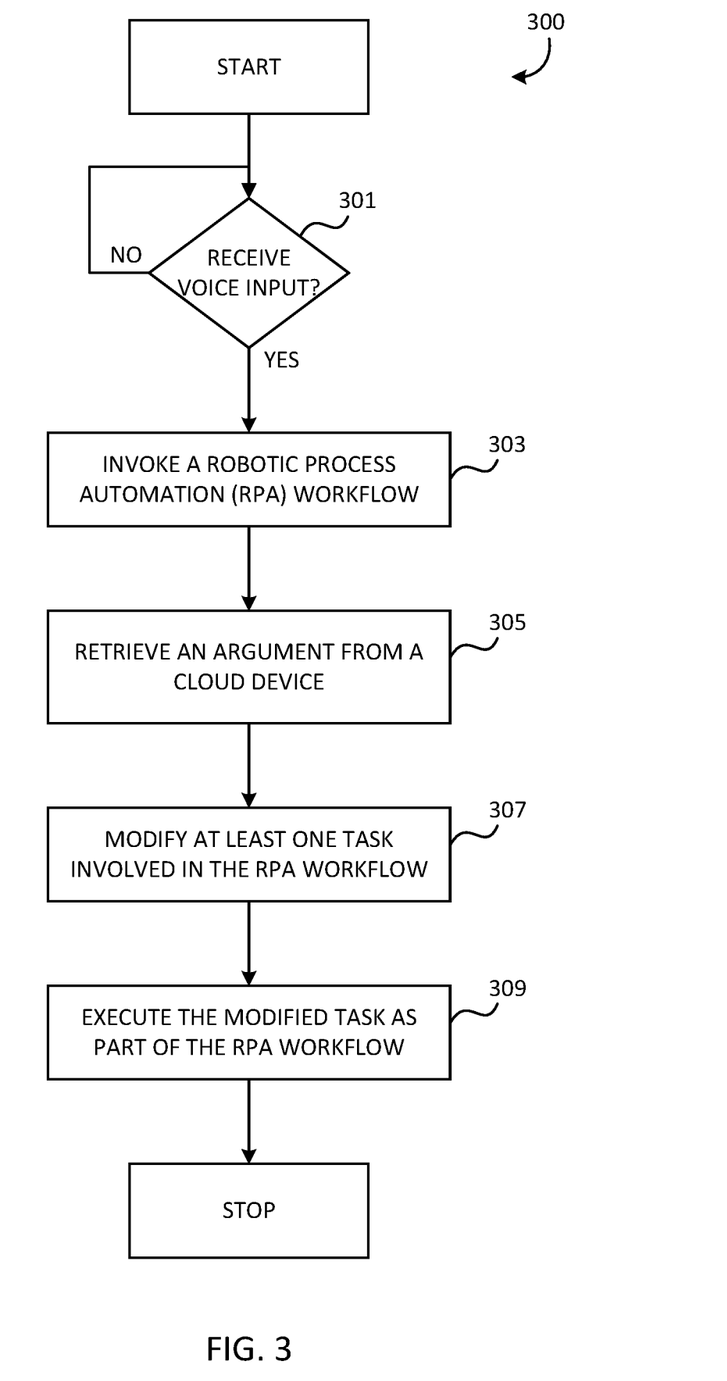
FIG. 3 is a flowchart illustrating a computerized method for an RPA workflow with a cloud device.

FIG. 3 is a flowchart illustrating a computerized method for an RPA workflow with a cloud device according to an example. The method 300 illustrated in FIG. 3 is for illustration only. Other examples of the method 300 can be used without departing from the scope of the present disclosure. The method 300 can be implemented by one or more components of the system 100 illustrated in FIG. 1, such as the components of the computing apparatus 518 described in greater detail below in the description of FIG. 5. In particular, the steps of the method 300 can be executed by the processor 519 of the computing apparatus 518.

The method 300 begins by determining whether a voice input is received in operation 301. For example, the input reception module 110 receives a speech, or voice, input from a user. As described herein, the speech input is received as sound waves that form a word or strings of words. In some examples, speech recognition is executed by the computing apparatus 518 in order to convert the received speech input to a textual input. The computing apparatus 518 identifies at least one parameter in the textual input that corresponds to a task that is to be executed based on the received speech input. The computing apparatus 518 further determines a command based on the identified at least one parameter. Upon determining a voice input has been received, the method 300 proceeds to operation 303. Upon determining a voice input has not been received, the method 300 returns to the beginning and again determines whether a voice input is received.

In operation 303, the computing apparatus 518 invokes the RPA workflow. In some examples, the particular RPA workflow is invoked based on the identified at least one parameter in the received input and converted via the speech recognition module 120. For example, the identified at least one parameter indicates the particular RPA workflow to be invoked.

In operation 305, the RPA workflow is controlled to retrieve an argument from a cloud device, such as the cloud device 160. As described above, retrieving an argument can include transmitting a request for an argument to the cloud device 160. The cloud device 160 receives the request for the argument, processes and analyzes the request, and generates and transmits the argument to the computing apparatus 518.

In some examples, the computing apparatus 518 receives a second input in real-time. For example, the computing apparatus 518 can receive an additional voice input after the reception of the first voice input in operation 301. Based on the received second input, the computing apparatus 518 retrieves an updated argument from the cloud device 160 in real-time based on the received second voice input. For example, the computing apparatus 518 transmits an updated request to the cloud device 160 and receives an updated argument from the cloud device 160.

In operation 307, the computing apparatus 518 modifies at least one task of the sequence of tasks of the RPA workflow. Modifying the at least one task includes performing a different operation in the particular task rather than the original task in the sequence of tasks. For example, in the example of opening of the new tab in the specific web browser to the particular URL described above, modifying a task can include, but is not limited to, reading a different CSV file from the file explorer, invoking a different web service, converting the json file to a different custom object, setting a different variable, launching a different browser, and navigating to a different set variable.

In operation 309, the computing apparatus 518 executes the modified at least one task on a user interface, such as the user interface 150, with the argument retrieved from the cloud device 160. In some examples, the at least one modified task is automatically executed on the user interface 150. As described herein, the term automatically executed refers to executing the modified task without additional user input.

Figure 4:
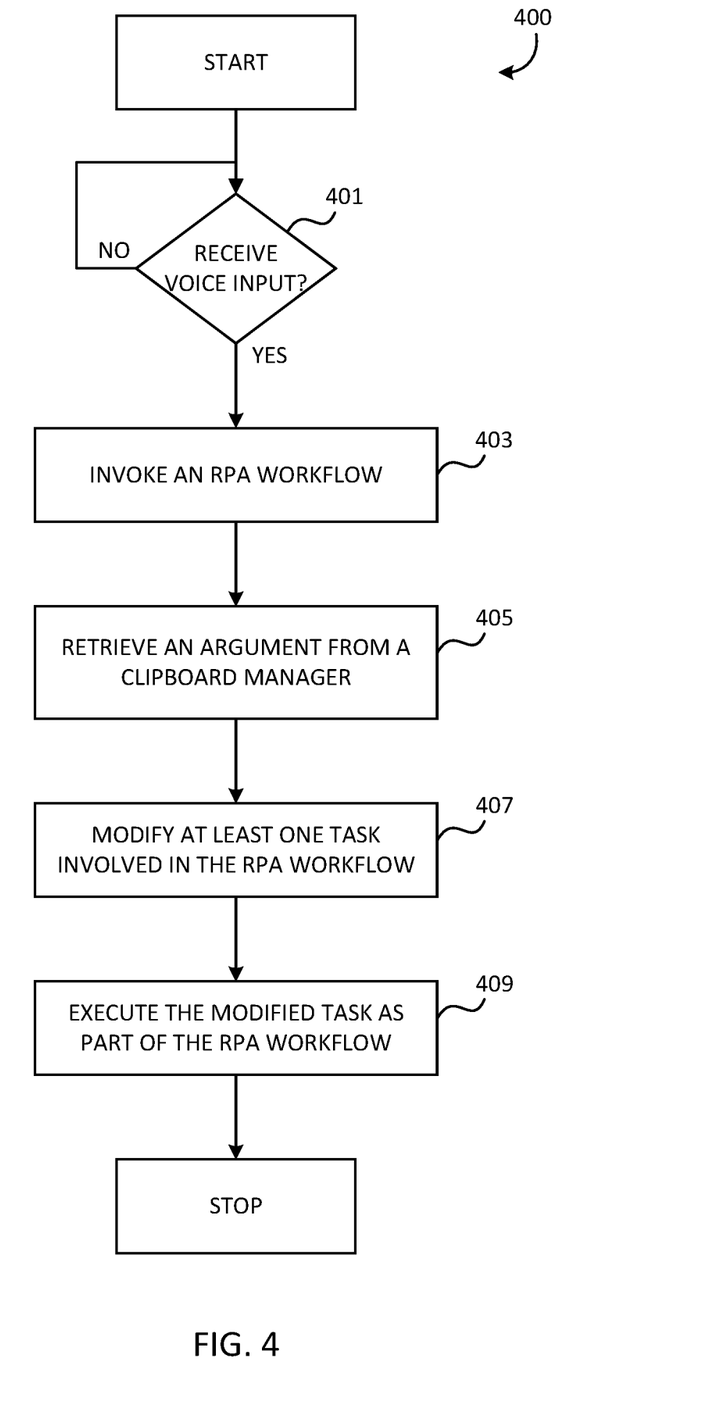
FIG. 4 is a flowchart illustrating a computerized method for an RPA workflow with a clipboard manager.

FIG. 4 is a flowchart illustrating a computerized method for an RPA workflow with a clipboard manager according to an example. The method 400 illustrated in FIG. 4 is for illustration only. Other examples of the method 400 can be used without departing from the scope of the present disclosure. The method 400 can be implemented by one or more components of the system 100 illustrated in FIG. 1, such as the components of the computing apparatus 518 described in greater detail below in the description of FIG. 5. In particular, the steps of the method 400 can be executed by the processor 519 of the computing apparatus 518.

Operations 401 and 403 of the method 400 are identical to the operations 301 and 303 of the method 300. In operation 401, the input reception module 110 determines whether a speech, or voice, input is received from a user. As described herein, the speech input is received as sound waves that form a word or strings of words. In some examples, speech recognition is executed by the computing apparatus 518 in order to convert the received speech input to a textual input. The computing apparatus 518 identifies at least one parameter in the textual input that corresponds to a task that is to be executed based on the received speech input. The computing apparatus 518 further determines a command based on the identified at least one parameter. Upon determining a voice input has been received, the method 400 proceeds to operation 403. Upon determining a voice input has not been received, the method 400 returns to the beginning and again determines whether a voice input is received.

In operation 403, the computing apparatus 518 invokes RPA. In some examples, the particular RPA workflow, or sequence, is invoked based on the identified at least one parameter in the received input and converted via the speech recognition module 120. For example, the identified at least one parameter indicates the particular RPA workflow to be invoked.

In operation 405, the process automation is controlled to retrieve an argument from a clipboard manager, such as the clipboard manager 170. As described above, retrieving an argument can include transmitting a request for an argument to the clipboard manager 170. The clipboard manager 170 receives the request for the argument, processes and analyzes the request, and generates and transmits the argument to the computing apparatus 518.

In some examples, the computing apparatus 518 receives a second input in real-time. For example, the computing apparatus 518 can receive an additional voice input after the reception of the first voice input in operation 401. Based on the received second input, the computing apparatus 518 retrieves an updated argument from the clipboard manager 170 in real-time based on the received second voice input. For example, the computing apparatus 518 transmits an updated request to the cloud device 160 and receives an updated argument from the clipboard manager 170.

In operation 407, the computing apparatus 518 modifies at least one task of the sequence of tasks of the RPA workflow. Modifying the at least one task includes performing a different operation in the particular task rather than the original task in the sequence of tasks. For example, in the example of opening of the new tab in the specific web browser to the particular URL described above, modifying a task can include, but is not limited to, reading a different CSV file from the file explorer, invoking a different web service, converting the json file to a different custom object, setting a different variable, launching a different browser, and navigating to a different set variable.

In operation 409, the computing apparatus 518 executes the modified at least one task on a user interface, such as the user interface 150, with the argument retrieved from the clipboard manager 170 as part of the RPA workflow. In some examples, the at least one modified task is automatically executed on the user interface 150. As described herein, the term automatically executed refers to executing the modified task without additional user input.

It should be appreciated that although described herein as separate computerized methods, the method 300 and the method 400 can be executed in parallel or in combination. For example, as described in the description of FIG. 2, an argument can be retrieved from both the cloud device 160 and the clipboard manager 170 in order to execute the tasks of the particular RPA module 130.

Exemplary Operating Environment

Figure 5:
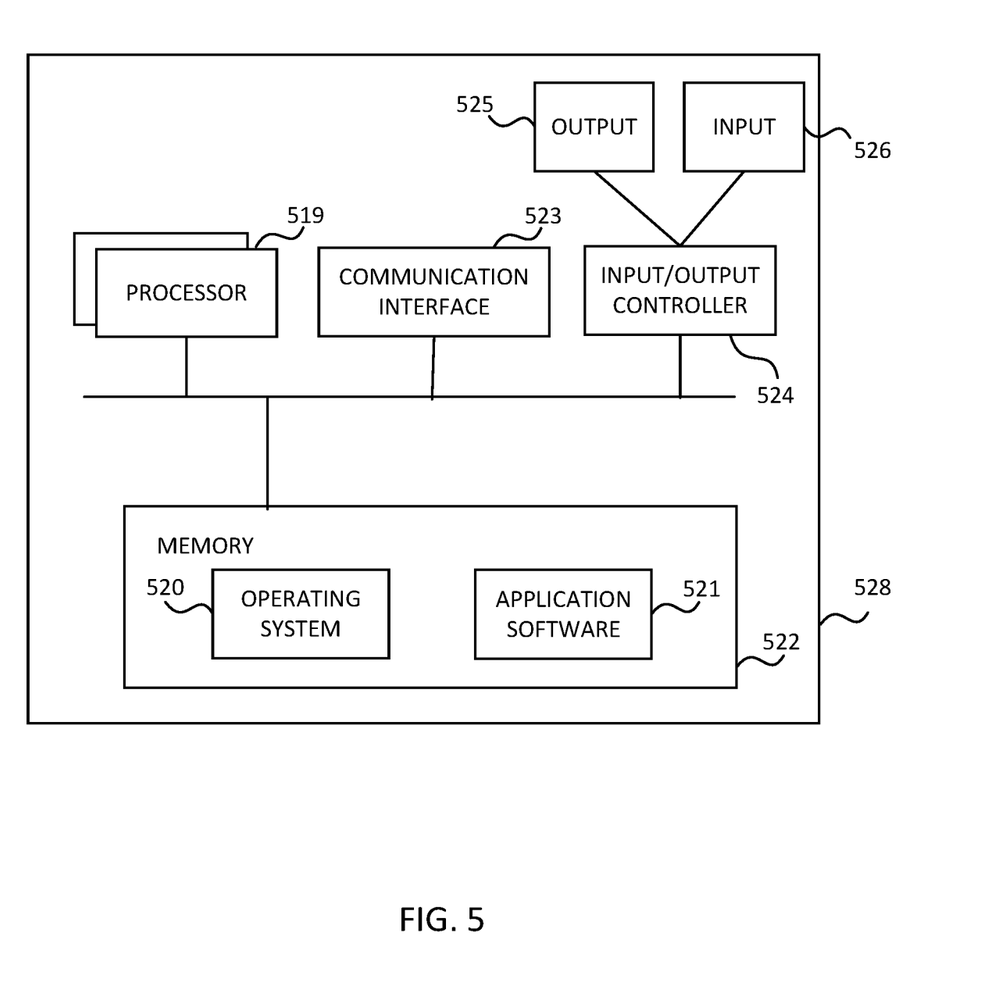
FIG. 5 illustrates an example computing apparatus as a functional block diagram.

The present disclosure is operable with a computing apparatus according to an example as a functional block diagram 500 in FIG. 5. In an example, components of a computing apparatus 518 may be implemented as a part of an electronic device according to one or more examples described in this specification. For example, the computing apparatus 518 can be the computing device 101 illustrated in FIG. 1. The computing apparatus 518 comprises one or more processors 519 which may be microprocessors, controllers, or any other suitable type of processors for processing computer executable instructions to control the operation of the electronic device. Alternatively, or in addition, the processor 519 is any technology capable of executing logic or instructions, such as a hardcoded machine. Platform software comprising an operating system 520 or any other suitable platform software may be provided on the apparatus 518 to enable application software 521 to be executed on the device.

Computer executable instructions may be provided using any computer-readable media that are accessible by the computing apparatus 518. Computer-readable media may include, for example, computer storage media such as a memory 522 and communications media. Computer storage media, such as a memory 522, include volatile and non-volatile, removable, and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 522) is shown within the computing apparatus 518, it will be appreciated by a person skilled in the art, that the storage may be distributed or located remotely and accessed via a network or other communication link (e.g., using a communication interface 523). For example, the communication interface 523 can transmit commands to the cloud device 160.

In some examples, the computer-readable media includes instructions that, when executed by the processor 519, execute instructions for the speech recognition module 120, the RPA module 130, the ML model 140, and the clipboard manager 170.

The computing apparatus 518 may comprise an input/output controller 524 configured to output information to one or more output devices 525, for example a display or a speaker, which may be separate from or integral to the electronic device. For example, the output device 525 can be the user interface 150. The input/output controller 524 may also be configured to receive and process an input from one or more input devices 526, for example, a keyboard, a microphone, or a touchpad. In some examples, the one or more input devices 526 is the input reception module 110. In one example, the output device 525 may also act as the input device. An example of such a device may be a touch sensitive display that functions as both the input reception module 110 and the user interface 150. The input/output controller 524 may also output data to devices other than the output device, e.g., a locally connected printing device. In some examples, a user may provide input to the input device(s) 526 and/or receive output from the output device(s) 525.

The functionality described herein can be performed, at least in part, by one or more hardware logic components. According to an example, the computing apparatus 518 is configured by the program code when executed by the processor 519 to execute the examples of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example device for an RPA workflow using speech recognition includes at least one processor and at least one memory. The at least one memory includes computer program code. The at least one memory and the computer program code are configured to, with the at least one processor, cause the at least one processor to receive a voice input, invoke an RPA workflow comprising a sequence of tasks, based on the invoked RPA workflow, retrieve an argument from a cloud device, based on the retrieved argument, modify at least one task of the sequence of tasks in the RPA workflow, and execute the modified at least one task as part of the RPA workflow.

An example computerized method for an RPA workflow using speech recognition includes receiving a voice input, invoking RPA workflow comprising a sequence of tasks, based on the invoked RPA workflow, retrieving an argument from a cloud device, based on the retrieved argument, modifying at least one task of the sequence of tasks in the RPA workflow, and executing the modified at least one task as part of the RPA workflow.

Example one or more computer storage media have computer-executable instructions process automation using speech recognition that, upon execution by a processor, cause the processor to receive a voice input, invoke RPA workflow comprising a sequence of tasks, based on the invoked RPA workflow, retrieve an argument from a cloud device, based on the retrieved argument, modify at least one task of the sequence of tasks in the RPA workflow, and execute the modified at least one task as part of the RPA workflow.

Alternatively, or in addition to the other examples described herein, examples include any combination of the following:

wherein the processor is configured to execute the modified at least one task by automatically interacting with a user interface (UI);
  wherein the processor is further configured to retrieve the argument from a clipboard manager;
  wherein the processor is further configured to train a machine learning (ML) model to learn a data flow including an order of the sequence of tasks;
  the ML model is configured to, based at least in part on the learned data flow, generate a new data flow;
  wherein the sequence of tasks includes respective tasks to read a particular CSV file, invoke a web service, convert a json file to a custom object, set a variable, launch a new browser window, create a new tab within the new browser window, and navigate the new tab to the set variable;
  wherein the processor is further configured to:
  identify at least one parameter in the received voice input;
  invoke the RPA workflow based on the identified at least one parameter;
  wherein the processor is further configured to:
  receive a second voice input in real-time; and
  retrieve an updated argument from the cloud device in real-time based on the received second voice input.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one example or may relate to several examples. The examples are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

The invention claimed is:

1. A device comprising:
    a processor; and
    a memory comprising computer program code, the memory and the computer program code configured to, with the processor, cause the processor to:
        receive a voice input,
        invoke, using the received voice input, a robotic process automation (RPA) workflow, the RPA workflow comprising a sequence of tasks,
        determine, based on the sequence of tasks, to transmit a request for an argument to a cloud device, a clipboard manager, or both,
        based on the determination, transmit the request for the argument to the cloud device, the clipboard manager, or both,
        based at least on the invoked RPA workflow, retrieve, based on the request, the argument from the cloud device, the clipboard manager, or both,
        modify, with the retrieved argument, a task of the sequence of tasks, modifying the task including performing a different operation in the modified task than the task originally in the sequence of tasks, and
        execute the modified task as part of the RPA workflow.

2. The device of claim 1, wherein the processor is configured to execute the modified task by automatically interacting with a user interface (UI).

3. The device of claim 1, wherein the sequence of tasks comprises reading a file, copying text from the read file, transmitting a command to the clipboard manager to store the copied text, launching an email application as a foreground window, executing a new mail task in the email application, and pasting the copied text from the clipboard manager into the new mail task.

4. The device of claim 1, wherein:
    the processor is further configured to train a machine learning (ML) model to learn a data flow including an order of the sequence of tasks, and
    the ML model is configured to, based at least in part on the learned data flow, generate a new data flow.

5. The device of claim 1, wherein the sequence of tasks includes respective tasks to read a particular file, set a variable, and navigate a browser window to the set variable.

6. The device of claim 1, wherein the processor is further configured to:
    identify a parameter in the received voice input, and
    invoke the RPA workflow based on the identified parameter.

7. The device of claim 1, wherein the processor is further configured to:
    receive a second voice input in real-time, and
    retrieve an updated argument from the cloud device in real-time based on the received second voice input.

8. A computer-implemented method comprising:
    receiving a voice input;
    invoking, using the received voice input, a robotic process automation (RPA) workflow, the RPA workflow comprising a sequence of tasks;
    determining, based on the sequence of tasks, to transmit a request for an argument to a cloud device, a clipboard manager, or both;
    based on the determination, transmitting the request for the argument to the cloud device, the clipboard manager, or both;
    based at least on the invoked RPA workflow, retrieving, based on the request, the argument from the cloud device, the clipboard manager, or both;
    modifying, with the retrieved argument, a task of the sequence of tasks, modifying the task including performing a different operation in the modified task than the task originally in the sequence of tasks; and
    executing the modified task as part of the RPA workflow.

9. The computer-implemented method of claim 8, further comprising executing the modified task by automatically interacting with a user interface (UI).

10. The computer-implemented method of claim 8, wherein the sequence of tasks comprises reading a file, copying text from the read file, transmitting a command to the clipboard manager to store the copied text, launching an email application as a foreground window, executing a new mail task in the email application, and pasting the copied text from the clipboard manager into the new mail task.

11. The computer-implemented method of claim 8, further comprising:
   training a machine learning (ML) model to learn a data flow including an order of the sequence of tasks, and
   based at least in part on the learned data flow, generating a new data flow.

12. The computer-implemented method of claim 8, wherein the sequence of tasks includes respective tasks to read a particular file, invoke a web service, set a variable, and navigate a browser window to the set variable.

13. The computer-implemented method of claim 8, further comprising:
   identifying a parameter in the received voice input; and
   invoking the RPA workflow based on the identified parameter.

14. The computer-implemented method of claim 8, further comprising:
   receiving a second voice input in real-time; and
   retrieve an updated argument from the cloud device in real-time based on the received second voice input.

15. A computer-readable storage medium comprising a plurality of instructions that, when executed by a processor, cause the processor to:
   receive a voice input,
   invoke, using the received voice input, a robotic process automation (RPA) workflow, the RPA workflow comprising a sequence of tasks,
   determine, based on the sequence of tasks, to transmit a request for an argument to a cloud device, a clipboard manager, or both,
   based on the determination, transmit the request for the argument to the cloud device, the clipboard manager, or both,
   based at least on the invoked RPA workflow, retrieve, based on the request, the argument from the cloud device, the clipboard manager, or both,
   modify, with the retrieved argument, a task of the sequence of tasks, modifying the task including performing a different operation in the modified task than the task originally in the sequence of tasks, and
   execute the modified task as part of the RPA workflow.

16. The computer-readable storage medium of claim 15, further comprising instructions that, when executed by the processor, cause the processor to:
   execute the modified task by automatically interacting with a user interface (UI).

17. The computer-readable storage medium of claim 15, wherein the sequence of tasks comprises reading a file, copying text from the read file, transmitting a command to the clipboard manager to store the copied text, launching an email application as a foreground window, executing a new mail task in the email application, and pasting the copied text from the clipboard manager into the new mail task.

18. The computer-readable storage medium of claim 15, further comprising instructions that, when executed by the processor, cause the processor to:
   train a machine learning (ML) model to learn a data flow including an order of the sequence of tasks; and
   based at least in part on the learned data flow, generate a new data flow.

19. The computer-readable storage medium of claim 15, further comprising instructions that, when executed by the processor, cause the processor to:
   identify a parameter in the received voice input, and
   invoke the RPA workflow based on the identified parameter.

20. The computer-readable storage medium of claim 15, further comprising instructions that, when executed by the processor, cause the processor to:
   receive a second voice input in real-time, and
   retrieve an updated argument from the cloud device in real-time based on the received second voice input.

* * * * *